(12) United States Patent
Schwenk

(10) Patent No.: US 7,862,752 B2
(45) Date of Patent: Jan. 4, 2011

(54) APPARATUS AND METHOD FOR CHECKING MOLD VENT CONDITION

(76) Inventor: Terry L. Schwenk, 9030 32nd Ave., Kenosha, WI (US) 53142

( * ) Notice: Subject to any disclaimer, the term of this patent is extended or adjusted under 35 U.S.C. 154(b) by 658 days.

(21) Appl. No.: 11/535,534

(22) Filed: Sep. 27, 2006

(65) Prior Publication Data
US 2008/0073805 A1      Mar. 27, 2008

(51) Int. Cl.
G01B 13/00      (2006.01)
B29C 45/76      (2006.01)

(52) U.S. Cl. .................. 264/40.1; 425/812; 73/37.5

(58) Field of Classification Search ........... 425/812, 425/136, 137; 264/40.1, 101, 102, 571; 73/37.5
See application file for complete search history.

(56) References Cited

U.S. PATENT DOCUMENTS

| | | | |
|---|---|---|---|
| 3,329,748 A | 7/1967 | Hugger | |
| 3,946,595 A * | 3/1976 | Carlson | 73/37 |
| 4,097,565 A | 6/1978 | Cole et al. | |
| 4,185,492 A | 1/1980 | Hauk et al. | |
| 4,573,900 A * | 3/1986 | Smith | 425/157 |
| 4,584,877 A | 4/1986 | Brayman | |
| 5,417,900 A * | 5/1995 | Martin, Sr. | 264/40.5 |
| 6,527,538 B1 * | 3/2003 | Pickutoski et al. | 425/546 |
| 2002/0100860 A1 * | 8/2002 | Wieder | 249/141 |

FOREIGN PATENT DOCUMENTS

| | | | |
|---|---|---|---|
| JP | 59-027243 | * | 2/1984 |
| JP | 59027243 | * | 2/1984 |

OTHER PUBLICATIONS

"Hot Runners Help the Balancing Process," MoldMaking Technology magazine, Dec. 2003 (5 pages).

* cited by examiner

*Primary Examiner*—Joseph S Del Sole
*Assistant Examiner*—Robert Dye
(74) *Attorney, Agent, or Firm*—Jansson Shupe & Munger Ltd.

(57) ABSTRACT

Apparatus and method for checking the venting of a mold having one or more vents, the apparatus comprising a vacuum source, a flow connection between the source and the mold, and a vacuum gauge connected to the flow connection, whereby vacuum measurement by the gauge correlates with total effective venting area of the mold.

14 Claims, 11 Drawing Sheets

APPARATUS AND METHOD FOR CHECKING MOLD VENT CONDITION

FIELD OF THE INVENTION

This invention is generally related to the field of molding of parts and more particularly related to issues related to the performance of vents within molds.

BACKGROUND OF THE INVENTION

During the process of net shape molding an engineered part, liquid material such as molten plastic resin or magnesium alloy is injected into one or more mold cavities in a mold through gates provided in the mold. As the material is introduced into the mold cavities, the air which resides inside the cavities must escape through vents in the mold. Vents are typically located across a cavity from the gates. Venting also can occur through the parting lines formed between the two halves of the mold, typically called the cavity half and the core half of a mold. Vents are sized such that air will flow out of the vents but the moldable material will not follow it through the vents.

As the liquid to be molded into a part flows into a mold cavity, a thin skin is formed along the walls of the cavity as the material begins to solidify due to cooling or curing at the walls. The skin that is formed serves to prevent the material from flowing out through the vents and also contributes to the surface appearance and surface hardness of the parts being molded. Molds are then cooled (or heated or allowed to cure depending on the liquid material and the molding process being employed) to cause the material to solidify into the desired parts. As the material solidifies, some shrinkage typically occurs; the amount of shrinkage is dependent on the amount of material "packed" into the cavity. In parts requiring a higher degree of dimensional precision, the amount of shrinkage is accounted for in the design of the mold and in the selection of the moldable material being used to form the part.

The need for determining the condition of vents in molds is applicable to many different molding processes and materials. Among these are plastic injection molding, plastic blow-molding, liquid silicone molding, and magnesium alloy injection molding, to name a few. Plastic injection molding is a familiar technology, and the need for such checking of mold vent condition is easily understood within the context of plastic injection molding and thus will be discussed further in this context.

It is important that the total area of the venting in a mold cavity be neither too small nor too large. Too little venting can cause a number of problems in the plastic parts being molded. Examples of problems caused by not providing enough venting area in a mold cavity are: (a) warpage or other evidences of unwanted internal stresses in the parts after cooling; (b) short filling or voids (portions of part not formed due to inadequate material introduced into a cavity); (c) burn marks or fractured parts caused by combustion of trapped gases at very high pressure; and (d) poor surface finish caused by inadequate packing of the cavity with resin material.

The primary symptom of excessive venting in a cavity is the formation of flash on the part being molded in the cavity. Thus, there is an optimal amount of venting required in an injection mold cavity to produce a part of the highest quality.

In molds which contain multiple cavities, it is important that the venting be uniform cavity-to-cavity so that the multi-cavity mold obtain balanced filling of each cavity. All of the problems associated with improper (too little or too much) venting occur in multi-cavity molds with the added complexity that for all cavities of a mold to produce "good parts" during a molding cycle, uniform venting performance in each cavity must be achieved. Non-uniform shrinkage of the parts from different cavities or non-uniform weight of these parts are additional evidences of improper venting in multi-cavity molds.

Injection molding is generally used to produce a large number of parts from each mold through the repetitive cycling (filling, cooling, and part-ejection) of the injection molding process. During this large number of cycles, it is inevitable that material build-up occurs in a mold such that vents become blocked, parting lines may not align in the desired fashion, and/or cavity-to-cavity imbalances in venting can develop. Thus, a mold which is optimally set up to produce parts of the highest quality will over time produce parts of diminished quality.

With all of these possible vent-related causes of "bad parts" from the injection molding process, there is a need for a way to ensure that the desired amount of venting is provided in an injection mold cavity. One way to achieve excellent venting performance in an injection mold is to be able to measure reliably and repeatably to amount of venting in a mold cavity such that one can monitor how the venting is changing and take corrective action when the amount of venting moves out of a desired range. One method of attempting to achieve such a measurement is through application of pressurized air to a cavity and subsequent measurement of the time it takes for the air to leak from the cavity. Such approach is mentioned in the December 2003 issue (volume 6, number 12) of "Moldmaking Technology" magazine, page 17, in an article by the present inventor. Such pressure-based leak-down approach is unsuccessful in that it lacks adequate precision and sufficient repeatability for useful cavity-venting assessment.

OBJECTS OF THE INVENTION

It is an object of this invention, in the field of molding technology, to provide both apparatus and a method to assess the condition of the vents within a mold.

Another object of this invention is to provide both apparatus and a method which are able to determine what the optimum vent should be in a mold.

Another object of this invention is to provide apparatus which assists in producing molded parts which are free of flashing and yet are fully-formed parts (parts without voids).

Another object of this invention is to provide both apparatus and a method to measure reliably and repeatably the total effective venting area of a mold.

Another object of this invention is to provide both apparatus and a method which minimize the formation of internal stresses within molded parts.

Another object of this invention is to provide both vent-measurement apparatus and a method which enable molding process operators to perform preventive maintenance on molds in a timely manner in order to prevent the manufacture of defective parts.

Another object of this invention is to provide both vent-measurement apparatus and a method which provides data to assist in the prediction of when vents within molds will cause mold failure.

Still another object of this invention is to provide both vent-measurement apparatus and a method which are easily adaptable to both single- and multi-cavity molds.

Yet another object of this invention is to provide both apparatus and a method which assists in establishing uniform cavity-to-cavity performance in multi-cavity molds.

These and other objects of the invention will be apparent from the following descriptions and from the drawings.

SUMMARY OF THE INVENTION

This invention is apparatus and a method for checking the venting of a mold in order to improve the quality of the parts produced in the mold. The inventive apparatus for checking the venting of a mold having one or more vents is comprised of (1) a vacuum source, (2) a flow connection between the source and the mold, and (3) a vacuum gauge connected to the flow connection, whereby vacuum measurement by the gauge correlates with total effective venting area of the mold.

In a preferred embodiment of the invention, the vacuum source is a Venturi driven by a compressed gas supply, and the compressed gas supply may include a pressure regulator. In some embodiments of the inventive apparatus, the vacuum source produces a zero-flow vacuum of between 10 and 30 inches of mercury.

Some preferred embodiments of the inventive vent-checking apparatus further include a calibration blockage whereby flow from the mold is zero to enable calibration of the apparatus. The calibration blockage may be a shutoff valve positioned in the flow connection between the mold and the vacuum gauge.

In another preferred embodiment of the inventive apparatus, the flow connection includes a mold interface connection configured to mate with one or more vents.

The inventive method for checking the venting of a mold having one or more vents is comprised of the steps of (1) connecting a vacuum source to the mold through a flow connection having a vacuum gauge and (2) measuring the vacuum in the flow connection with the gauge, whereby the vacuum measurement correlates with total effective venting area of the mold.

In a preferred embodiment of the inventive vent-checking method, measurement performed on the mold after determining that there is acceptable mold performance establishes an optimal total effective venting area.

Another preferred embodiment of the inventive method further includes the step of comparing the total effective venting area measured after mold usage to the optimal total effective venting area, thereby determining mold performance degradation.

A preferred embodiment of the inventive vent-checking method can be used on an individual cavity of a multi-cavity mold. Some preferred embodiments of this method further include the step of blocking the flow from the mold to provide a zero-venting calibration measurement, and some preferred embodiments further include the step of blocking one or more vents in order to measure the total effective venting area of the remaining vents. In another preferred embodiment, the blocking step includes occluding one or more vents with a removable vent-conformable material. In some of these embodiments, the conformable material may be wax or putty.

As described in the context of one preferred embodiment of the inventive method, other of the preferred embodiments of the inventive method described above may be used on an individual cavity of a multi-cavity mold. Further, the inventive method may also be successively performed on plural cavities of the multi-cavity mold.

As used herein the term "zero-venting calibration measurement" means the vacuum measurement taken by the gauge when the apparatus is configured to assure that the flow connection is connected to a mold or other apparatus through which no flow can occur, a so-called "zero-leakage" condition.

While the word "blockage" normally contemplates the process of blocking, the term "calibration blockage" as used herein refers to the object (e.g., valve, tube pincher, custom fixture, sealing material, or the like) which entirely stops the airflow from the flow connection of apparatus for checking the venting of a mold in order to create a stable and repeatable vacuum baseline "zero-leakage" condition."

The term "zero-flow vacuum" as used herein refers to the vacuum achieved by a vacuum source when the flow to the vacuum source is completely shut off.

The term "total effective venting area" as used herein is defined to refer to a relative measure of the total venting area active during a measurement. Effective venting area conceptually correlates with a measure of the cross-sectional area of a vent in a mold but is not equal to such cross-sectional area. The pressure-flow relationships which describe a vent are dependent on many parameters such as vent geometry (e.g., the long, wide but very thin passages of a mold parting line). The concept of "area" is useful since for any given mold vent geometry, a larger cross-sectional area of a mold vent will result in a lower vacuum measurement (given that the other dimensions of the vent are the same), and, similarly, a smaller cross-sectional area of a mold vent will result in a higher vacuum measurement. The "optimal total effective venting area" is that value of the total effective venting area for which the performance of the mold is at its best.

The term "mate to a vent" as used herein refers to the positioning of the flow connection such that the only airflow into the flow connection is through the mold vents to be measured. The term does not imply a particular geometric shape of the flow connection other than it is such that the intended flow condition can be achieved.

DETAILED DESCRIPTION OF PREFERRED EMBODIMENTS

Figure 1:
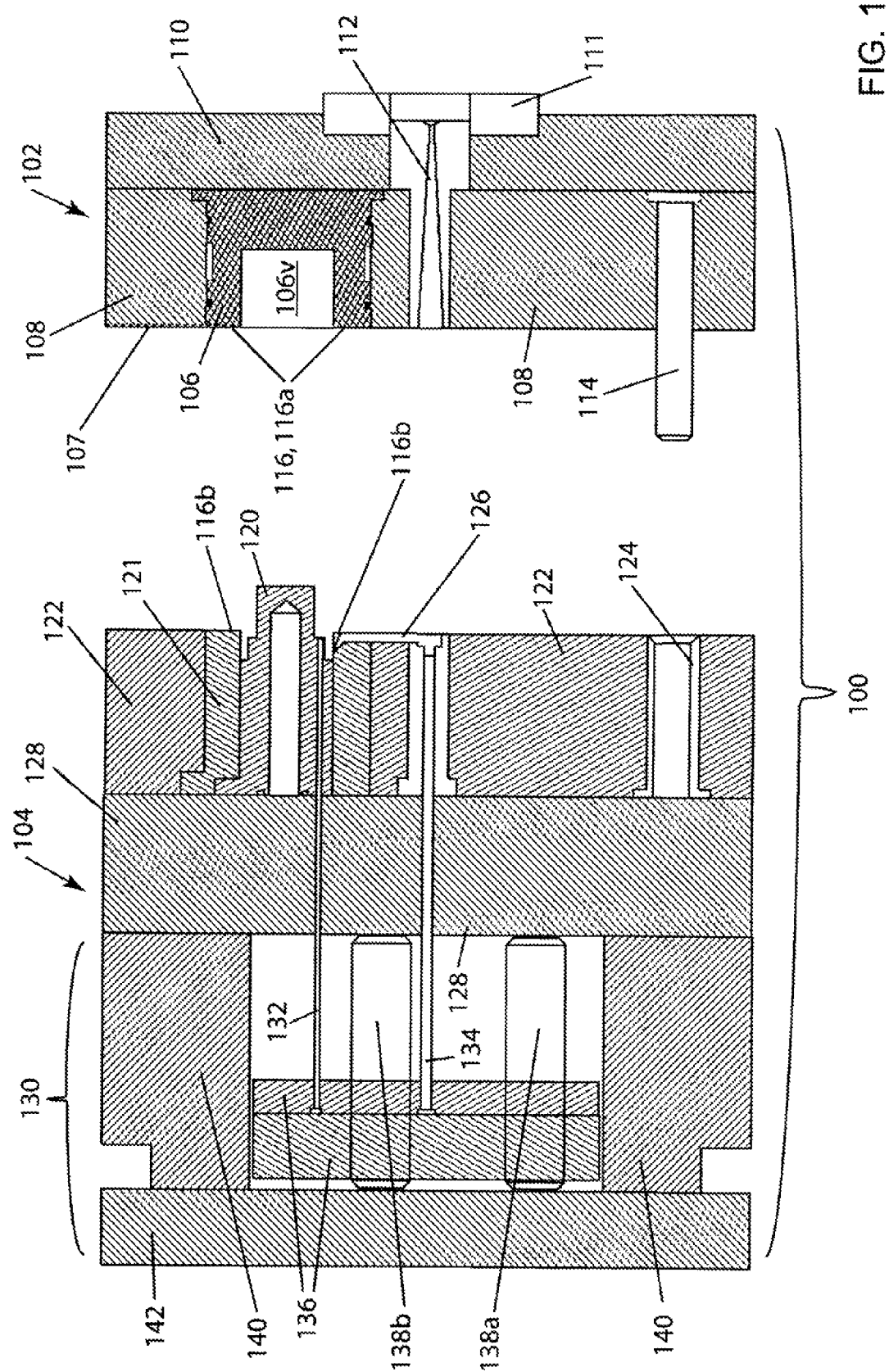
FIG. 1 is a cross-sectional schematic drawing of a representative assembled plastic injection mold.

In order to describe the present invention, it is necessary to first describe a representative mold on which the checking of mold vents can occur. FIG. 1 is a cross-sectional schematic drawing of a representative assembled injection mold 100, shown in an "open" position and containing no moldable material (e.g., thermoplastic material). Mold 100 is comprised of two primary sub-assemblies, a cavity portion 102 and a core portion 104. Cavity portion 102 includes a cavity 106, a cavity plate 108, and a cavity clamp plate 110, a sprue 112 through which molten thermoplastic is introduced into mold 100, and a leader pin 114. As is known to those familiar with the field of injection molding, cavity portions of other molds can include plural cavities, plural leader pins, and other additional parts in order to be used to mold multiple parts at the same time. Further, the construction of molds is dependent on the configuration of the part or parts being molded therein, and numerous variations of mold design and components are possible and known in the art.

Cavity portion 102 further includes a parting line vent 116 with a parting line vent surface 116a and a vent dump 107. Vent 116 is formed by the mating of surface 116a with a core portion vent surface 116b on core portion 104. Cavity portion 102 and core portion 104 are mounted within an injection molding machine (not shown) and brought together (in a "closed" position) in mating relationship such that surfaces 116a and 116b form parting line vent 116 through which air escapes as molten thermoplastic material is forced into cavity 106 (mated with a core 120) to form the intended plastic part (not shown). The air flowing through vent 116 escapes through vent dump 107. Other vent locations within representative mold 100 will be described later in the document.

Core portion 104 includes core 120 which with cavity 106 form a shaped void (not shown in "mold-closed" position) into which the thermoplastic material flows to create the part (not shown) being produced. Core portion 104 further includes: (a) a core plate 122 which includes a leader pin bushing 124 adapted to receive leader pin 114 as mold 100 is closed; (b) a runner 126 positioned to transmit molten thermoplastic from sprue 112 into cavity 106; (c) a core support plate 128; and (d) an ejector assembly 130 adapted to facilitate removal of the part after the molten thermoplastic material has solidified in cavity 106. In FIG. 1, ejector assembly 130 includes an ejector pin 132 and a sprue puller 134 which are pushed to the right (in FIG. 1) by the movement of an ejector plate 136 actuated by an actuator (not shown but well-known to those skilled in the art of injection molding). Pin 132 ejects the solidified part from core 120 and puller 134 ejects the thermoplastic material which has solidified in runner 126 and sprue 112. Ejector plate 136 is guided in its movement by two ejector guides 138a and 138b. Ejector assembly 130 also includes ejector rails 140 (two shown in FIG. 1) which also serve as structural support and guides for ejector plate 136, and an core clamp plate 142. In a fashion similar to cavity clamp plate 110, core clamp plate 142 facilitates the mounting of core portion 104 into an injection molding machine (not shown). As in the case of cavity portion 102 previously discussed, the core portions of other molds may include plural cores to mate with plural cavities, additional ejector pins, and many more and complex components within the mold, dependent on the configuration and number of parts being formed within the mold. Mold 100 is described merely as a representative mold for the purpose of describing the operation of the apparatus and method of the present invention.

Figure 2:
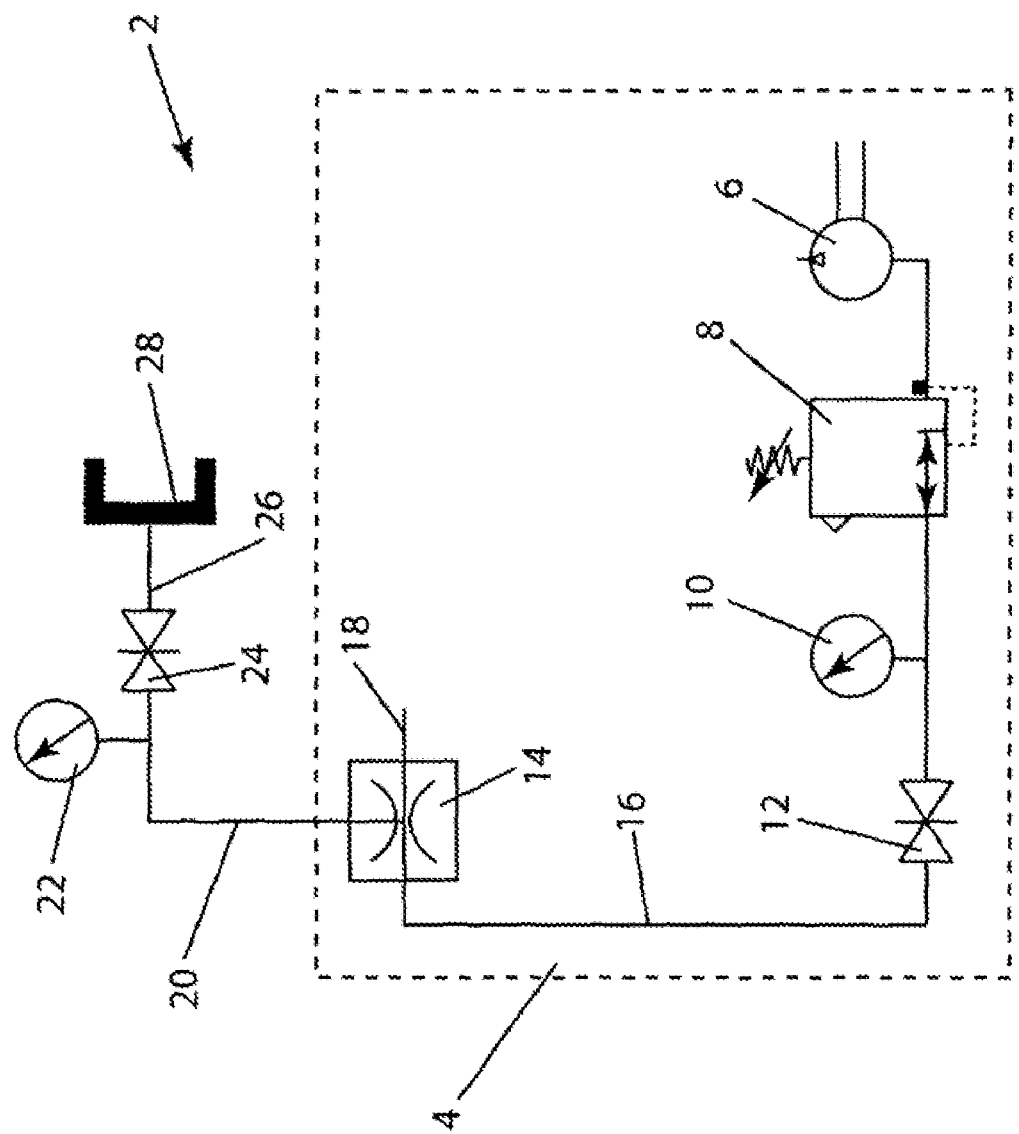
FIG. 2 is a pneumatic circuit diagram of one embodiment of the inventive apparatus for checking the venting of a mold.
Figure 3:
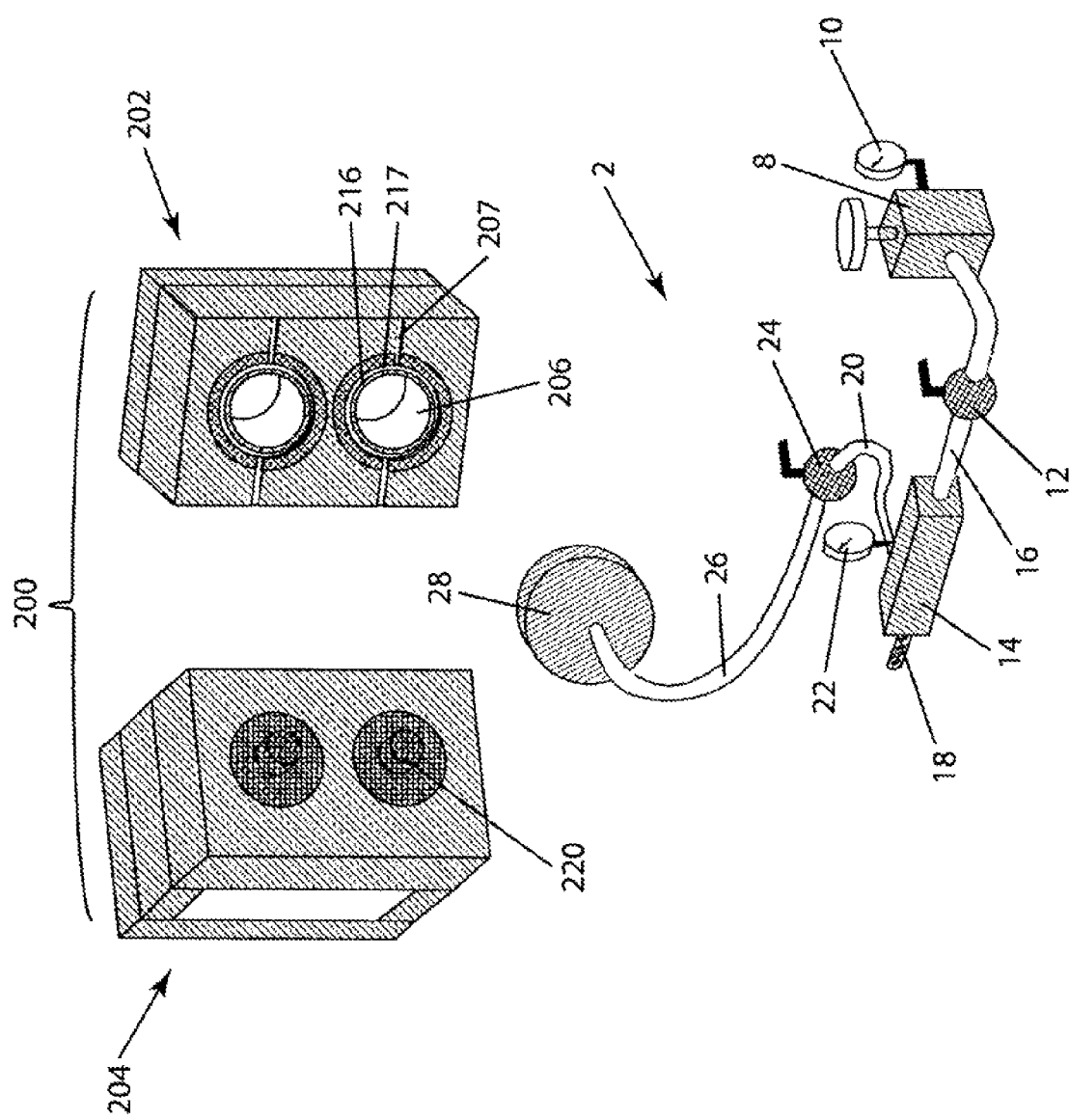
FIG. 3 is perspective drawing of one embodiment of the inventive apparatus for checking the venting of a mold, shown with a representative two-cavity injection mold.
Figure 4:
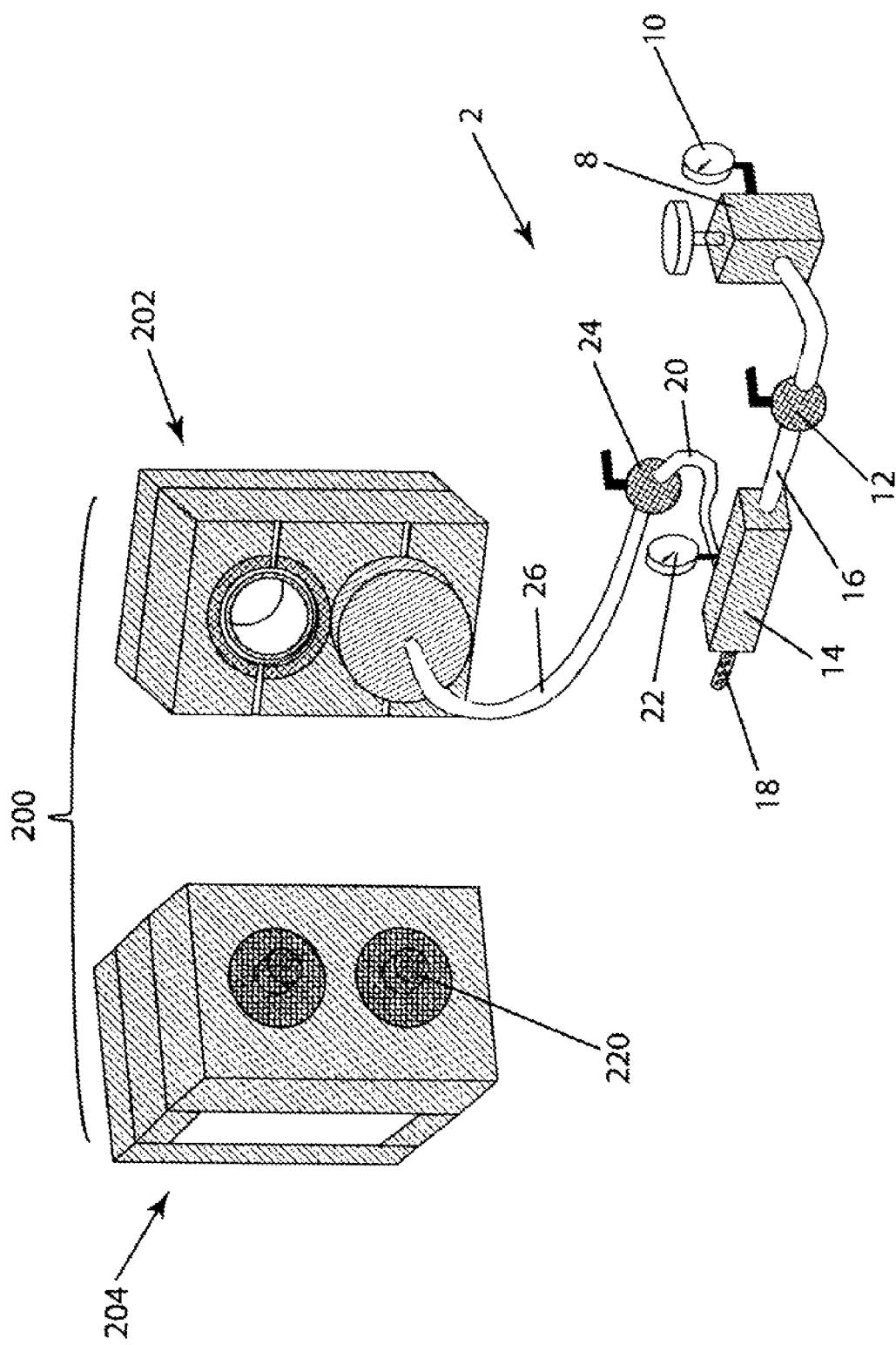
FIG. 4 is a perspective drawing of the apparatus and mold of FIG. 3 with the apparatus in position to check the venting of one cavity of the mold.

FIG. 2 is a pneumatic circuit diagram of one embodiment of the mold-vent-checking apparatus 2. FIG. 3 shows a perspective drawing of mold-vent-checking apparatus 2 configured to check the venting of a simple, two-cavity mold 200 including a cavity portion 202 and a core portion 204. FIG. 4 presents a perspective drawing with vent-checking apparatus 2 in position to check the venting of one cavity 206 in cavity portion 202 of mold 200.

Referring to FIG. 2, mold-vent-checking apparatus 2 includes a vacuum source 4 (shown within a dotted box in FIG. 2) which includes: (a) a compressor 6 providing a source flow of compressed air; (b) a pressure regulator 8; (c) a pressure gauge 10 measuring the output pressure from regulator 8; (d) a pressure shutoff valve 12 for turning apparatus 2 ON and OFF; and (e) a Venturi tube 14 which generates a vacuum in a vacuum conduit 20 by virtue of compressed air flowing through Venturi 14 from an input conduit 16 and out of an output conduit 18. In this embodiment, mold-vent-checking apparatus 2 further includes a vacuum gauge 22 for measuring the level of vacuum resulting from vacuum source 4 being connected to mold 100, a fixture conduit 26 and a vent-isolation flow connection 28 through which apparatus 2 is connected to mold 100, and a vacuum shutoff valve 24.

FIGS. 3 and 4 illustrate the inventive apparatus for checking the venting of a mold in position (FIG. 3) to check one cavity of a representative two-cavity injection mold 200 (FIGS. 3 and 4). Mold 200 includes cavity portion 202, core portion 204, cavity 206, core 220, parting line vent 216, a vent collector 217 and dump 207. Vent collector 217 serves to "collect" air vent through parting line vent 216 and channel it to dump 207.

In an example embodiment, Venturi 14 can be a Model AV60 Venturi vacuum generator available from Teknocraft Inc., 425 West Drive, Melbourne, Fla. 32904, USA. Vacuum gauge 22 can be a Model 2074 vacuum gauge available from Ashcroft Inc., 250 East Main Street, Stratford, Conn. 06614, USA. Pressure regulator 8 can be a Model T102-120 psi ¼ NPT gauge available from Marsh Bellofram Corporation, State Route 2, Box 305, Newell, W. Va. 26050, USA.

Regulator 8 drops the pneumatic pressure supplied by compressor 6 to a desired level and controls the pressure of its output to a preset value. In this embodiment, the regulated output pressure of regulator 8 ranges approximately between 40 and 90 psi (pounds per square inch), producing a vacuum output (zero flow vacuum) of Venturi 14 in vacuum conduit 20 of between 10 and 30 in.Hg (inches of mercury). The zero-flow vacuum level is used to establish the operating condition of mold-vent-checking apparatus 2 such that when a measurement is taken, each measurement is always referenced to its zero-flow vacuum so that subsequent measurements can be taken under equivalent conditions, thereby allowing the measured values to be compared properly. The operating condition for mold-vent-checking apparatus 2 is set as follows: (I) establish air flow through Venturi 14 by setting pressure regulator 8 to a desired pressure and opening pressure shutoff valve 12; (ii) close vacuum shutoff valve 24 to create a zero total effective venting area condition; and (iii) adjust pressure regulator 8 until vacuum gauge 22 reads the displays the desired zero-flow vacuum reading. If a vacuum source other than that described in this embodiment is used and that vacuum source has a different way of establishing a repeatable operating condition, a zero-flow vacuum measurement as described here would not be required.

Figure 8:
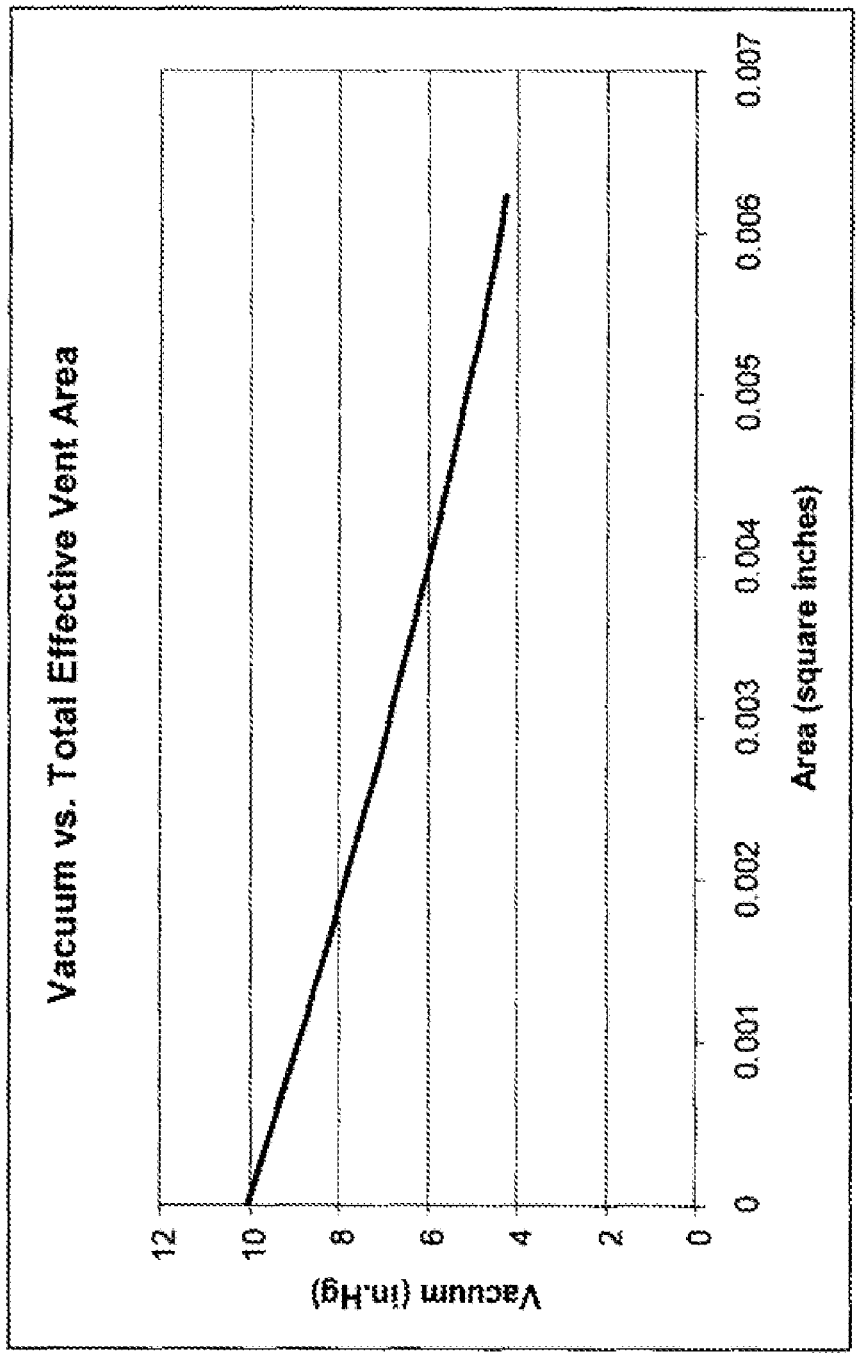
FIG. 8 is a graph representing the relationship between measured vacuum in the inventive apparatus as a function of the total effective vent area of the mold being measured.

The level of vacuum in vacuum conduit 20, measured by vacuum gauge 22, is dependent on the amount of air flowing into vent-isolation flow connection 28 through whatever mold vents are being checked by virtue of the placement of vent-isolation flow connection 28 on mold 100. The graph of FIG. 8 illustrates the general nature of this relationship. The graph plots the level of vacuum measured by vacuum gauge 22 versus the total effective venting area being checked by mold-vent-checking apparatus 2. As explained above, the amount of flow through the vents being measured causes the level of vacuum measured by vacuum gauge 22 to change: the higher flow through the vents, the lower the level of vacuum. If no flow is occurring, the measured vacuum is the zero-flow vacuum" measurement.

Figure 5:
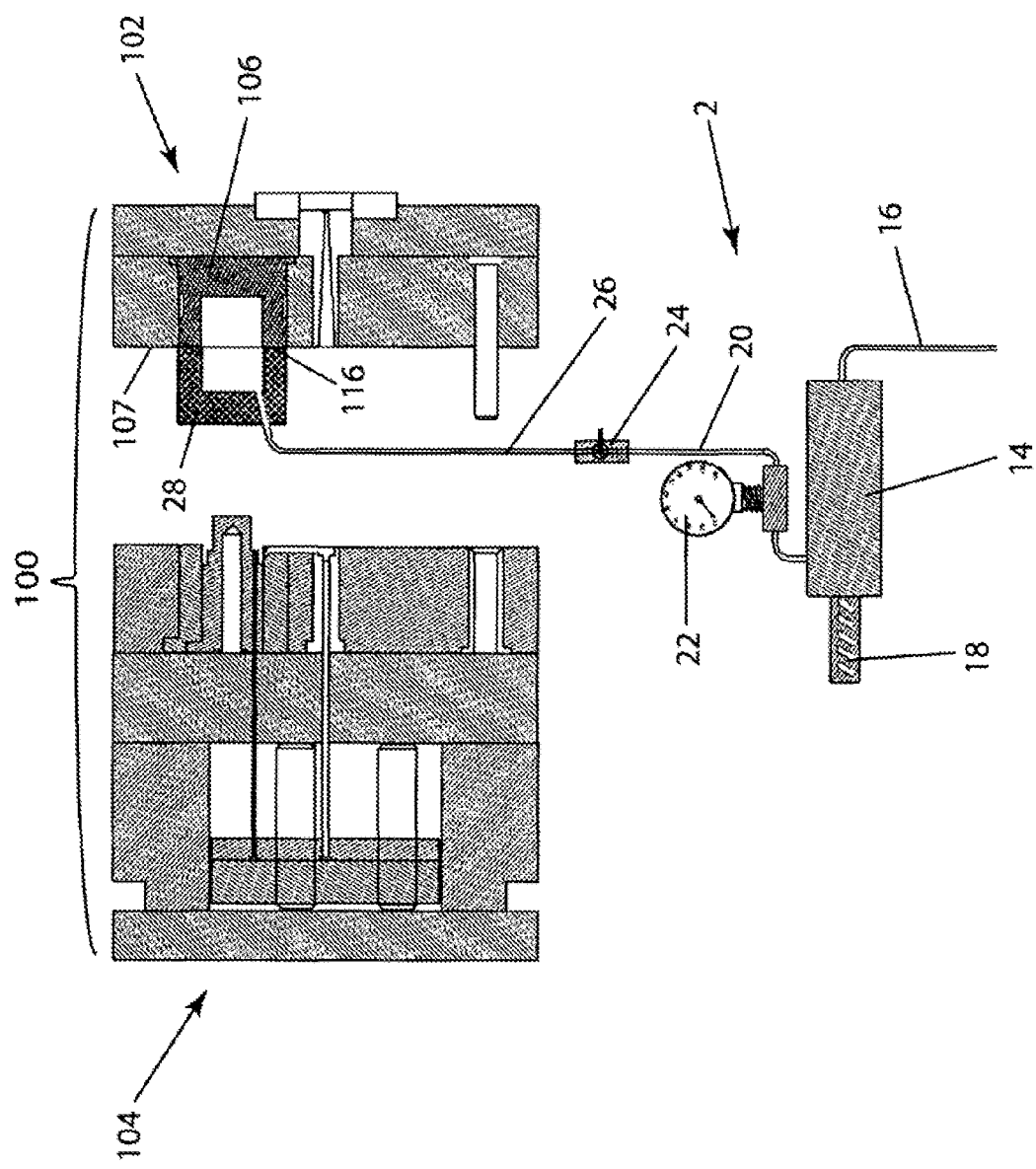
FIG. 5 is a cross-sectional schematic of the mold of FIG. 1 with the flow connection of the inventive apparatus of FIG. 3 in position to check the venting of one cavity of the mold.
Figure 6:
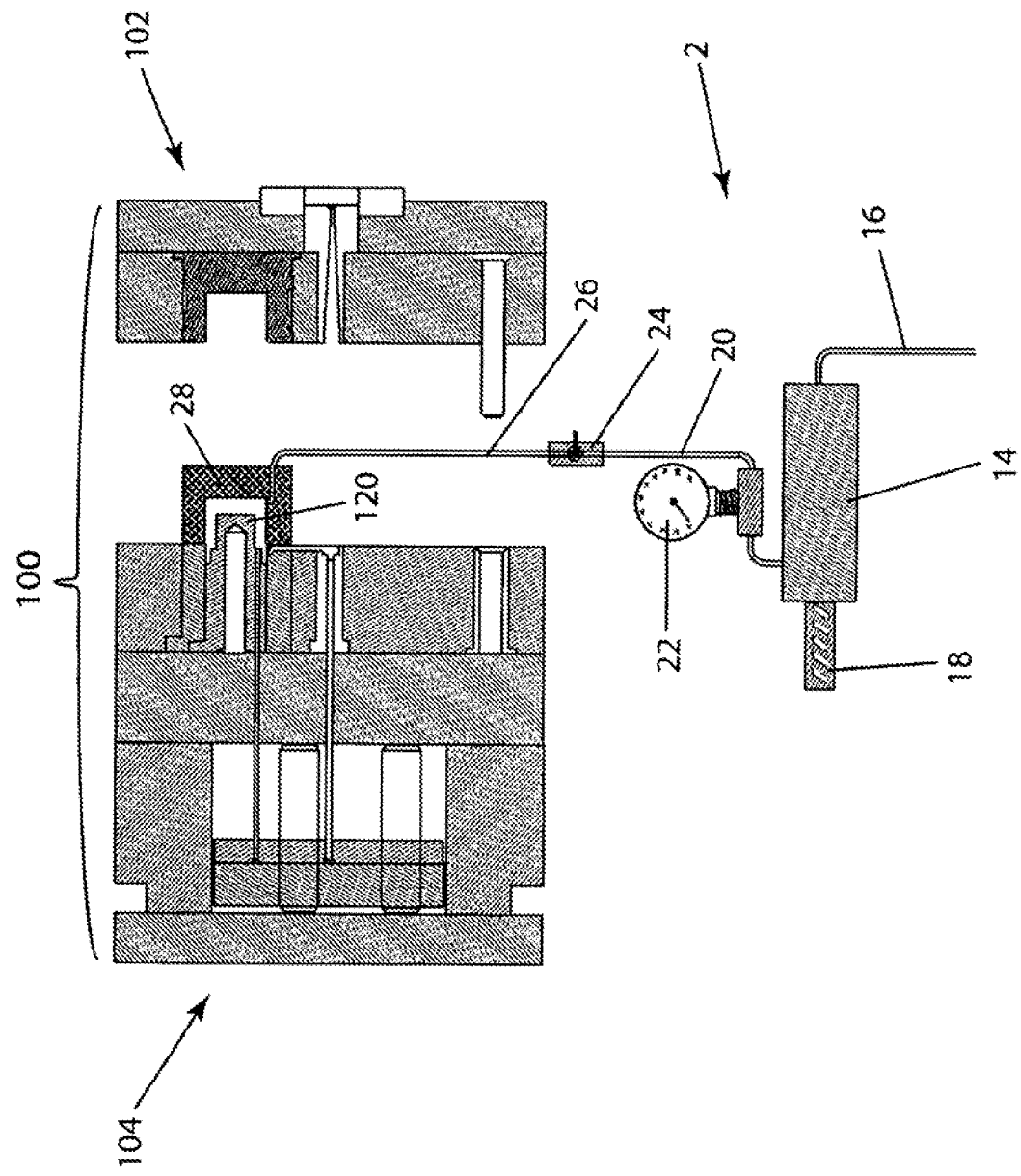
FIG. 6 is a cross-sectional schematic of the mold of FIG. 1 with the flow connection of the inventive apparatus of FIG. 3 in position to check the venting of one core portion of the mold.

FIGS. 5 and 6 illustrate mold-vent-checking apparatus 2 with flow connection 28 in position to check vents in cavity portion 102 (FIG. 5) and core portion 104 (FIG. 6). FIGS. 7A through 7D illustrate in more detail mold-vent-checking apparatus 2 mated to vents within core portion 104. In addition, FIG. 7A-7D illustrate to use of a vent-conformable material such as a vent-conformable putty as shown to isolate individual components of the total venting of core portion 102 of mold 100.

Figure 7A:
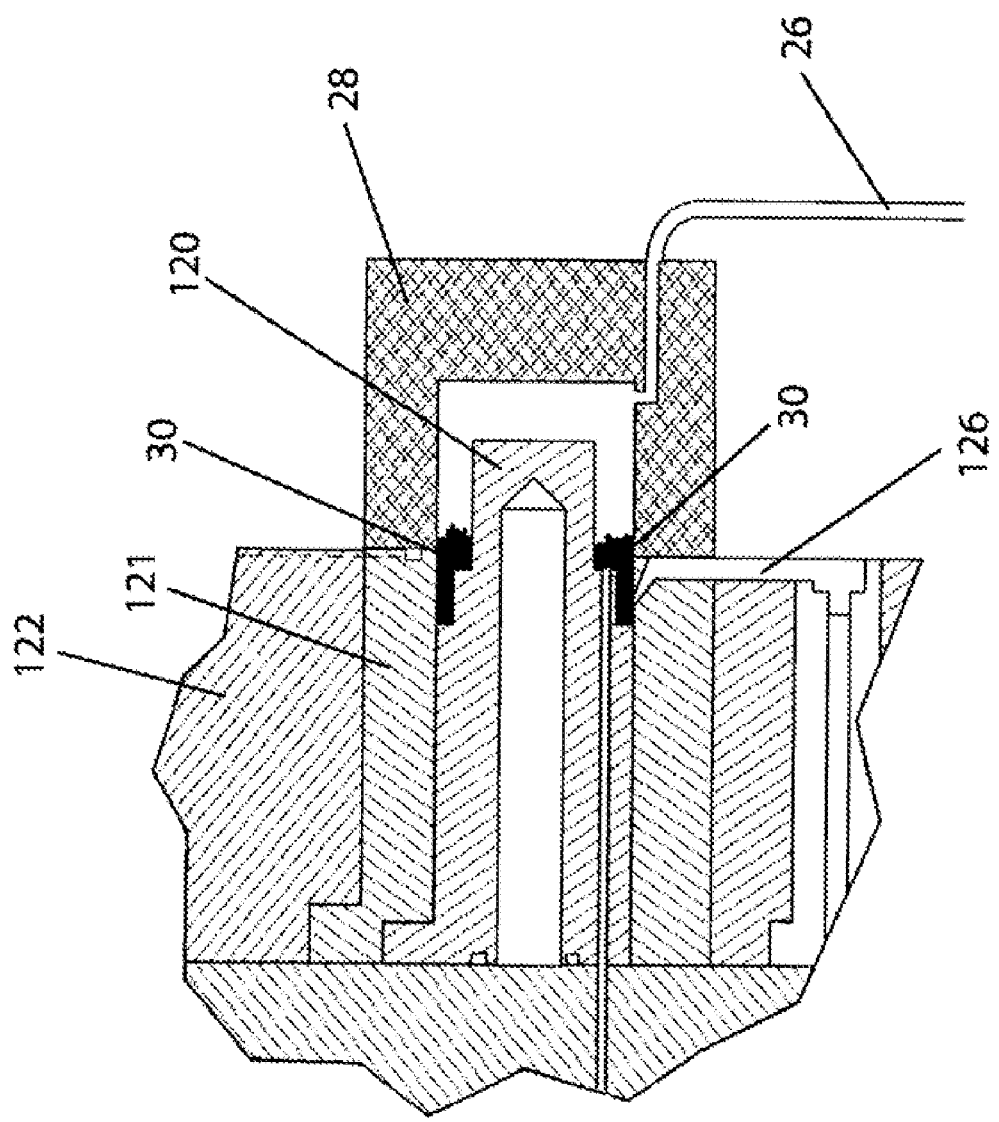
FIG. 7A is a partial cross-sectional schematic of one core portion of the mold of FIG. 1 with the flow connection of the inventive apparatus of FIG. 3 in position to check the venting of the core portion of the mold and with removable vent-conformable putty occluding all of the vents in the core portion of the mold in order to take a zero-venting calibration measurement.
Figure 7B:
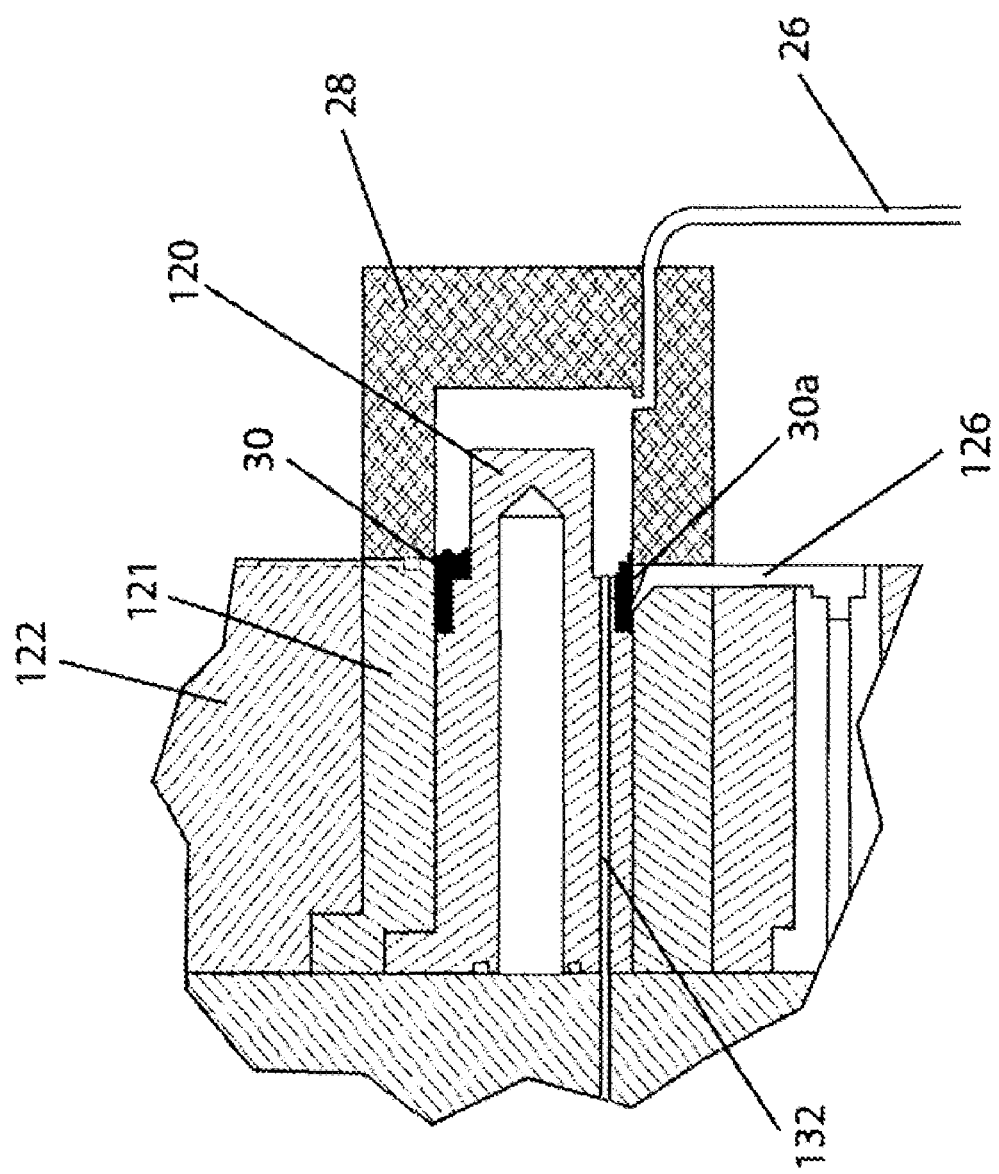
FIG. 7B is a partial cross-sectional schematic of one core portion of the mold of FIG. 1 with the flow connection of the inventive apparatus of FIG. 3 mated to the vent around an ejector pin, that is, in position to check the venting of the core portion of the mold with removable vent-conformable putty occluding all of the vents in the core portion of the mold except for a vent around an ejector pin in order to take a vacuum measurement isolating the ejector pin vent.
Figure 7C:
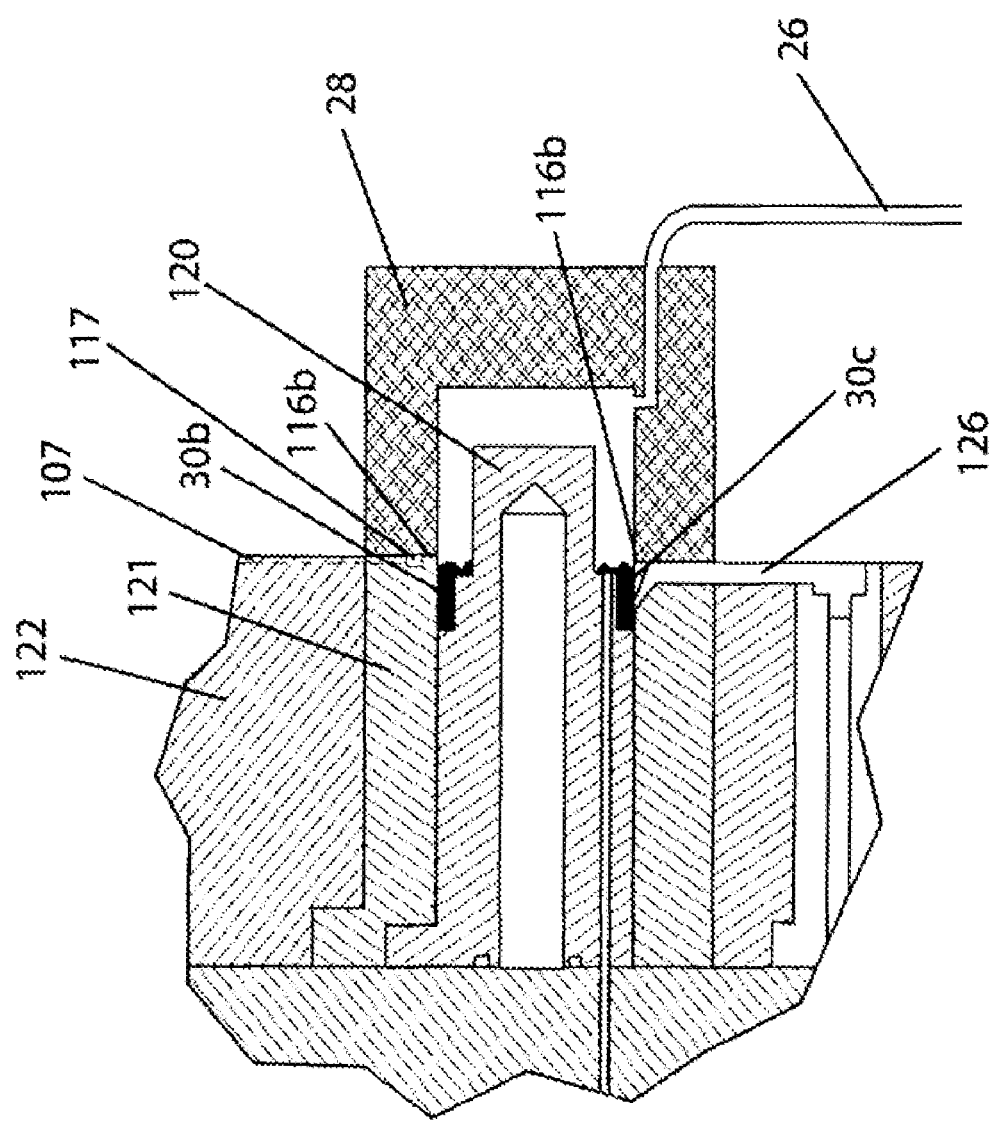
FIG. 7C is a partial cross-sectional schematic of one core portion of the mold of FIG. 1 with the flow connection of the inventive apparatus of FIG. 3 mated to a parting line vent, that is, in position to check the venting of the core portion of the mold with removable vent-conformable putty occluding all of the vents in the core portion of the mold except a parting-line vent in order to take a vacuum measurement isolating a parting-line vent.
Figure 7D:
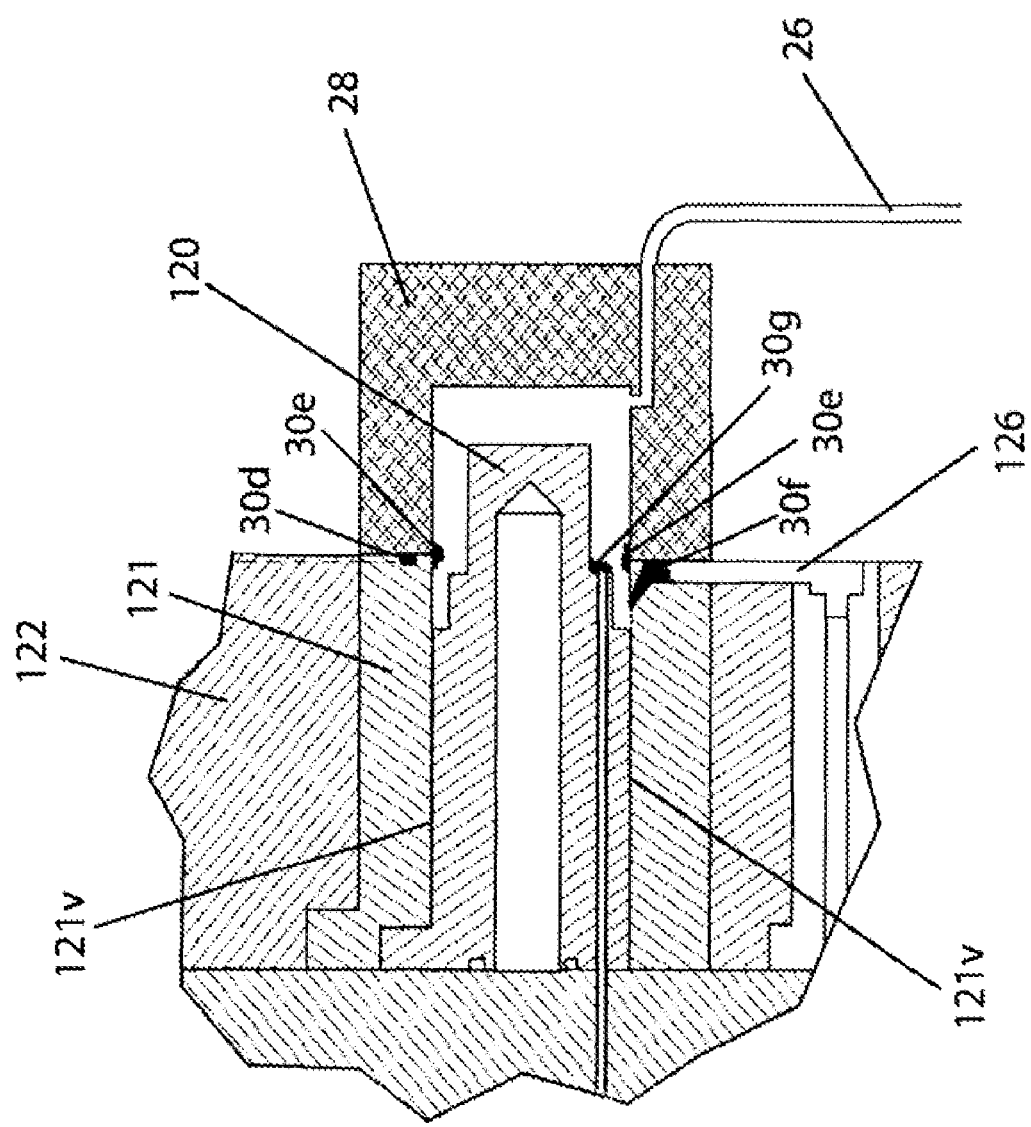
FIG. 7D is a partial cross-sectional schematic of one core portion of the mold of FIG. 1 with the flow connection of the inventive apparatus of FIG. 3 to a core sleeve vent, that is, in position to check the venting of the core portion of the mold with removable vent-conformable putty occluding all of the vents in the core portion of the mold except for a core sleeve vent in order to take a vacuum measurement isolating a core sleeve vent.

In FIG. 7A, vent-conformable putty 30 is placed to block all of the vents of core portion 102 to which flow connection 28 is mated. In FIG. 7B, vent-conformable putty 30 and 30a is placed to block all of the vents of core portion 102 except the vent which is situated around ejector pin 132, thus isolating this vent from other vents in order to perform a measurement on it individually. In a similar fashion, FIG. 7C illustrates vent-conformable putty 30b and 30c placed to block all of the vents of core portion 102 except the vent which is situated at the parting line, thus isolating the parting-line vent 116b (116b is the core portion 104 parting-line vent 116 mating surface which mates with surface 116a on cavity portion 102 to form parting-line vent 116) from other vents in order to perform a measurement on it individually. And, FIG. 7D illustrates vent-conformable putty 30d-30g placed to block all of the vents of core portion 102 except a core-sleeve vent 121v which is situated between core 120 and core sleeve 121, thus isolating core-sleeve vent 121v from other vents in order to perform a measurement on it individually.

An example application of mold-vent-checking apparatus 2 is now described. FIGS. 7C and 8 will be used in this example. The procedure is carried out as follows: (1) Establish a desired operating condition (zero-flow vacuum) for apparatus 2. In this example, the zero-flow vacuum is 10.03 in.Hg is shown in FIG. 8. (2) Place vent-conformable putty 30b and 30c to isolate parting-line vent 116b (portion of parting line vent 116 on core portion 104) from all other possible sources of air flow. (Individual parting-line vent 116 is used here as a simple example. Multiple vents can be measured together to establish any desired combination of observations in order to correlate mold performance with vent conditions.) (3) Record the vacuum measurement for this condition. One way to establish vent geometry for a given mold vent or combination of mold vents is to represent a configuration by a cross-sectional area, since the cross-sectional area is typically what is adjusted to change vent performance. Thus, FIG. 8 is shown using such an approach. (4) Establish the molding performance of mold 100. Depending on such performance, make adjustments to mold 100 including changes which result in changes parting-line vent 116. (5) Repeat steps 1-3. (6) Repeat step 4 as necessary, recording all vacuum measurements of vacuum related to parting-line vent 116 and resulting in a graph similar in form to that of the graph of FIG. 8. (7) When the individual cavity of mold 100 is performing at its best, note the measured vacuum level which thus corresponds to the "optimal total effective venting area." The specific value of this area is not relevant or important, only that parting-line 116 is set at its best geometry or configuration for best mold cavity performance. (8) For a multi-cavity mold, these steps are repeated for each cavity and for individual vents or combinations of individual vents as desired. (9) When mold performance degrades, such as in ways described in the background section above, carry out steps 1-3 on mold 100. (10) Make adjustments to vents as required in order to reestablish optimal conditions for mold 100.

As described above, FIG. 8 illustrates the relationship between total effective venting area and measured vacuum for a representative vent configuration. The numerical value of the venting area is not a particular cross-sectional area of the vent being measured but simply indicative conceptually of a variable which correlates with the amount of air flow during a measurement, given that other geometric variables are also unchanged (e.g., the same mold cavity is being measured). As already described above, area changes are often made and thus FIG. 8 illustrates such a relationship. In order for mold-vent-checking apparatus 2 to yield useful information during subsequent measurements, the operating conditions (zero-flow vacuum) for a vent configuration must be matched. For example, if a parting-line becomes clogged with unwanted material, its effective venting area will decrease and this will show as a higher vacuum measurement when apparatus 2 is mated to the same parting-line vent.

If the geometrical conditions of individual cavities in a multi-cavity mold are similar, mold-vent-checking apparatus 2 can be used to establish similar venting characteristics for each of the individual cavities in such a mold, thus producing uniform cavity-to-cavity performance and best mold performance for each cavity.

While the principles of this invention have been described in connection with specific embodiments, it should be understood clearly that these descriptions are made only by way of example and are not intended to limit the scope of the invention. For example, application of the invention is not limited to use with plastic injection molds but can be applied to any mold technology in which the condition of vents affects to performance of the mold.

The invention claimed is:

1. A method for before-molding checking of mold-venting, the before-molding method comprising:

providing a constant-pressure vacuum source including a pressure regulator;

connecting the vacuum source to an empty mold to be checked, the mold having located vents and at least one parting line, the connection having a flow-measuring vacuum gauge connected therewith;

blocking one or more vents; and measuring the vacuum in the flow connection with the gauge prior to molding, whereby the gauge measures the total effective venting area of the remaining vents before molding.

2. The method of claim 1 wherein measurement performed on the mold after determining that there is acceptable mold performance establishes an optimal total effective venting area.

3. The method of claim 2 further including comparing the total effective venting area measured after mold usage to the optimal total effective venting area, thereby determining mold performance degradation.

4. The method of claim 3 used on an individual cavity of a multi-cavity mold.

5. The method of claim 1 further including the step of blocking the flow from the mold to provide a zero-venting calibration measurement.

6. The method of claim 1 used on an individual cavity of a multi-cavity mold.

7. The method of claim 1 wherein the blocking step includes occluding one or more vents with a removable vent-conformable material.

8. The method of claim 7 wherein the vent-conformable material is selected from the group consisting of wax and putty.

9. The method of claim 1 used on an individual cavity of a multi-cavity mold.

10. The method of claim 9 successively performed on plural cavities of the multi-cavity mold.

11. A method for checking the venting of a mold having one or more vents, the method comprising:

connecting a vacuum source to the mold through a flow connection having a vacuum gauge; and measuring the vacuum in the flow connection with the gauge by blocking one or more vents in order to measure the total effective venting area of the remaining vents, whereby the vacuum measurement correlates with total effective venting area of the mold.

12. The method of claim 11 used on an individual cavity of a multi-cavity mold.

13. The method of claim 11 wherein the blocking step includes occluding one or more vents with a removable vent-conformable material.

14. The method of claim 13 wherein the vent-conformable material is selected from the group consisting of wax and putty.

* * * * *